UNITED STATES PATENT OFFICE 2,455,807

PREPARATION OF SUBSTITUTED CYANOGUANIDINE

Bryan C. Redmon and Daniel E. Nagy, Stamford, Conn., assignors to American Cyanamid Company, New York, N. Y., a corporation of Maine No Drawing. Application September 11, 1945, Serial No. 615,694

4 Claims. (Cl. 260—551)

This invention relates to substituted 3-cyanoguanidines and the preparation thereof.

The substituted 3-cyanoguanidines in the present invention are prepared by the reaction of primary or secondary amines with a dicyanimide.

In particular the substituted 3-cyanoguanidines may be represented by the formula

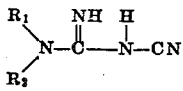

where $R_1$ is chosen from a member of the group consisting of hydrogen, aliphatic, aromatic, and heterocyclic radicals, and $R_2$ is chosen from a member of the group consisting of aliphatic, aromatic, and heterocyclic radicals.

In the present invention the 3-cyanoguanidines are prepared by the reaction of an amine of the formula

where $R_1$ and $R_2$ have the meanings above given, with dicyanimide. The general reaction is given by Equation 1 in which the R's have the meanings above given.

(1) 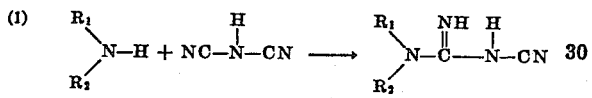

The present invention also contemplates that 3-cyanoguanidines may be prepared by the reaction of a primary or secondary amine salt with a dicyanimide salt. The reaction of these materials involves the formation of an inorganic salt and the simultaneous liberation of both the free amine and the free dicyanimide which then react according to Equation 1. The over-all reaction of the aforementioned amine and dicyanimide salts to produce a substituted 3-cyanoguanidine is shown in Equation 2, (2) 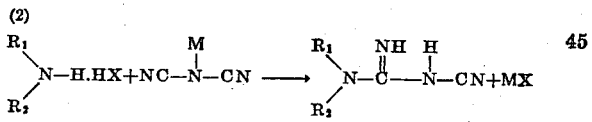

where the R's have the meanings above given, M is an ion of a metallic element, and X is the anion portion of an acid.

In actual practice it is preferred to prepare the substituted 3-cyanoguanidines of the present invention by the reaction of a primary or secondary amine salt with a dicyanimide salt, which is the form in which the dicyanimide is usually prepared, recovered, and stored.

The primary and secondary amines, which can be used in the preparation of substituted 3-cyanoguanidines, may be aliphatic, aromatic, and heterocylic. These types of amines may have various substituents on the organic radicals in addition to the reactive amino group. Amines typical of those capable of undergoing the reaction of the present invention are as follows:

Aliphatic amines:
    Methylamine
    Dimethylamine
    Ethylamine
    Diethylamine
    Propylamine
    Dipropylamine
    Isopropylamine
    Diisopropylamine
    Butylamine
    Dibutylamine
    Hexylamine
    Dihexylamine
    2-ethylhexylamine
    Di-2-ethylhexylamine
    Octylamine
    Dioctylamine
    Dodecylamine
    Didodecylamine
    Octadecylamine
    Dioctadecylamine
    Allylamine
    Diallylamine
    Octadecenylamine
    β-Sulfoethylamine
    γ-Sulfopropylamine
    Ethylenediamine
    Propylenediamine
    Tetramethylenediamine
    Hexamethylenediamine
    Decamethylenediamine
    Diethylenetriamine
    Triethylenetetramine
    Tetraethylenepentamine
    Cyclohexylamine
    Dicyclohexylamine
    Cyclopenthylamine
    Benzylamine
    Dibenzylamine
    β-Phenylethylamine
    Naphthylmethylamine
    Glycine
    β-Alanine
    Aminobutyric acid Aromatic amines:
  Aniline
  α-Naphthylamine
  β-Naphthylamine
  o-Aminodiphenyl
  Sulfanilic acid
  Sulfanilamide
  2-sulfanilamidopyrimidine
  Sulfanilylguanidine
  2-sulfanilamidopyrazine
  2-sulfanilamidopyridine
  2-sulfanilamidothiazole
  Aminonaphthalenesulfonic acid
  Aminotoluenesulfonic acid
  Aminophenols
  Aminonaphthols
  Methylaminophenols
  Aminothiophenols
  Toluidines
  Xylidines
  Methylnaphthylamines
  Aminoethylbenzenes
  Phenylenediamines
  Napthylenediamines
  Aminobenzoic acids
  Ethyl aminobenzoates
  Aminobenzamides
  Phenylglycines
  Aminophenylglycines
  Aminobenzaldehydes
  Ethylaniline
  Methylaniline
  Chloroanilines
  Bromoanilines
  Nitroanilines
  Anisidines
  Diaminophenols
  Diaminonaphthols
  Diaminodiphenylmethanes Heterocyclic amines:
  Piperidine
  Aminopyridine
  Morpholine
  Thiomorpholine
  Pyrrole
  Pyrroline
  Pyrrolidine
  Piperazine
  Amino-1,2-diazole
  Amino-1,3-diazole
  Amino-1,2,3-triazole
  Amino-1,2,4-triazole
  Furfurylamine These amines and their salts are typical of those which react with a dicyanimide to form a substituted 3-cyanoguanidine. It is to be understood that these amines may be substituted by various organic radicals, groups, or elements which do not prohibit their reactions with dicyanimide. Numerous substituents have already been illustrated in the above list of amines.

The reaction of the present invention may be run with or without either a solvent and/or a diluent or it may be run by the fusion of the reactants. The temperature range in which this reaction takes place is approximately 50°–125° C. However, the preferred temperature range for this reaction is approximately 750° C.

If the reaction of the present invention is carried out using a metal salt of dicyanimide it is to be understood that any metal salt from which the free dicyanimide may be liberated may be used. However, it is preferred that the calcium, sodium, and potassimum salts of dicyanimide be used because these compounds are the most inexpensive and the most easily prepared salt of dicyanimide.

If an amine salt is used as a source of amine for the reaction of the present invention, the use of common salts, such as the hydrochloride, sulfate, and acetate is preferred. Any salt from which the amine may be liberated is suitable for this reaction.

The examples which follow show the preparation of typical substituted 3-cyanoguanidines.

EXAMPLE 1

1-phenyl-3-cyanoguanidine

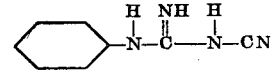

| Reactants | Molar Ratio |
|---|---|
| Potassium dicyanimide | 1.02 |
| Aniline | 1.00 |
| Hydrochloric acid | 1.00 |
| Water | 15.30 |

A solution of potassium dicyanimide in about three quarters of the above amount of water is mixed with aniline in a reaction vessel and heated to substantially 90° C. The hydrochloric acid is diluted with the remaining water, and this dilute acid is added dropwise to the hot agitated reaction mixture. When about half of the acid is added, crystals separate from solution. The heating of the reaction mixture is continued at substantially 90° C. for a period of time about half as long as that required for the addition of the dilute acid. The reaction mixture is then cooled and acidified with a small amount of acid, either hydrochloric or acetic, and the crystalline solid is recovered and washed with water. After drying, the 1-phenyl-3 cyanoguanidine melts at 194°–195° C., and is insoluble in water, dilute acid and diluted alkali, but is slightly soluble in aqueous ethanol. It does not give a colored complex when treated with alkaline copper sulfate.

EXAMPLE 2

1-p-sulfophenyl-3-cyanoguanidine

| Reactants | Molar Ra: |
|---|---|
| Calcium dicyanimide | 0.5 |
| Sulfanilic acid, monohydrate | 1.0 |
| Water | 17.5 |

The solid sulfanilic acid is slowly added to the stirred solution of calcium dicyanimide while the temperature is maintained at substantially 90° C. The reaction mixture is a clear solution until the sulfanilic acid addition is almost complete, and at that time a precipitate begins to form. The reaction mixture is heated for about two hours then cooled. The calcium salt of 1-p-sulfophenyl-3-cyanoguanidine separates and is recovered, washed with water, and air dried. This calcium salt is quite insoluble in hot water. The free acid may be recovered by treating the calcium salt with dilute hydrochloric acid in the cold.

EXAMPLE 3

1-methyl-1-phenyl-3-cyanoguanidine

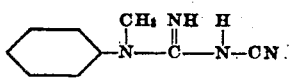

| Reactants | Molar Ratio |
| --- | --- |
| Calcium dicyanimide | 0.5 |
| Methylaniline | 1.0 |
| Hydrochloric acid | 1.0 |
| Water | 20.0 |

The calcium dicyanimide is dissolved in about three-quarters of the above amount of water and the methylaniline is added to this solution. The resulting mixture is agitated and heated at substantially 80° C. The hydrochloric acid is diluted with the remaining one-quarter of the water, and this dilute acid is slowly added to the reaction mixture while the temperature is maintained at substantially 80° C. The amine slowly dissolves and an oily product separates from the reaction mixture which is allowed to cool after the addition of the acid is completed. This oily material is stirred until it becomes crystalline. The resulting 1-methyl-1-phenyl-3-cyanoguanidine is recovered, washed, dried, and recrystallized from aqueous ethanol to yield a colorless crystalline solid which melts at 129°–134° C.

EXAMPLE 4

1-α-naphthyl-3-cyanoguanidine

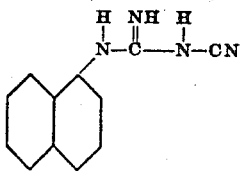

| Reactants | Molar Ratio |
| --- | --- |
| Calcium dicyanimide | 0.5 |
| α-Naphthylamine | 1.0 |
| Hydrochloric acid | 1.0 |
| Water | 20.0 |

A mixture of α-naphthylamine and aqueous calcium dicyanimide is prepared and heated to 80° C. as described in Example 2. The hydrochloric acid is likewise diluted and added slowly to the agitated mixture at approximately 80° C. The addition rate is such that the pH remains above 4 until the last of the acid has been added. A purple oil separates during the reaction and when cooled, it becomes a sticky solid, crude 1-α-naphthyl-3-cyanoguanidine. Upon recrystallization from acetone, the colorless crystalline 1-α-naphthyl-3-cyanoguanidine melts at 238° C.

EXAMPLE 5

1,1'-p-phenylene-bis-3,3'-cyanoguanidine

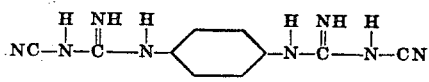

| Reactants | Molar Ratio |
| --- | --- |
| Calcium dicyanimide | 1.0 |
| p-Phenylenediamine | 1.0 |
| Hydrochloric acid | 2.0 |
| Water | 40.0 |

A mixture of p-phenylenediamine and calcium dicyanimide is prepared according to the method of Example 2. The reaction mixture is heated to substantially 80° C. while the hydrochloric acid, diluted with about one-quarter of the above amount of water, is slowly added thereto. The pH is maintained above 4.5 throughout the addition of the acid at the elevated temperature of approximately 80° C. After about half of the acid is added, solid starts to precipitate from the solution, and upon completion of the hydrochloric acid addition, the reaction mixture is cooled. The resulting crude 1,1'-p-phenylene-bis-3,3'-cyanoguanidine is soluble only with difficulty in the usual organic solvents. However, it is sufficiently soluble in Cellosolve (2-ethoxyethanol-1) to be recrystallized therefrom, and a colorless solid is obtained which does not decompose up to 314° C.

EXAMPLE 6

1-m-hydoxyphenyl-3-cyanoguanidine

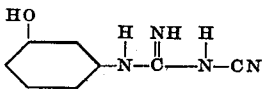

| Reactants | Molar Ratio |
| --- | --- |
| Calcium dicyanimide | 0.5 |
| m-Aminophenol | 1.0 |
| Hydrochloric acid | 1.0 |
| Water | 20.0 |

Again following the procedure of Example 2, the diluted hydrochloric acid is slowly added to the reaction mixture at 80° C. and the pH remains above 4.5 until almost all of the acid has been added. As the reaction progresses, the m-aminophenol dissolves and a clear brown solution results. When the latter is cooled, 1-m-hydroxyphenyl-3-cyanoguanidine crystallizes, and after recovery, crystallization from water, and drying, this material melts at 199°–200° C.

EXAMPLE 7

1-o-hydroxyphenyl-3-cyanoguanidine

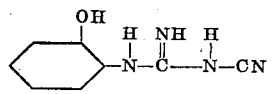

| Reactants | Molar Ratio |
| --- | --- |
| Calcium dicyanimide | 0.5 |
| o-Aminophenol | 1.0 |
| Hydrochloric acid | 1.0 |
| Water | 20.0 |

The procedure followed is essentially that used in Example 6 above. The o-ominophenol dissolves and a crude, gummy material precipitates and slowly crystallizes when the reaction mixture is cooled. Much of the colored impurity present in this crude 1-o-hydroxyphenyl-3-cyanoguanidine may be extracted with dilute hydrochloric acid or acetic acid prior to its recrystallization from hot water. The brownish needles resulting from this treatment decompose with the evolution of ammonia at 173° C.

Example 8

1-cyclohexyl-3-cyanoguanidine

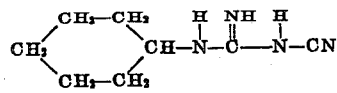

(a)

| Reactants | Molar Ratio |
| --- | --- |
| Calcium dicyanimide | 0.5 |
| Cyclohexylamine hydrochloride | 1.0 |
| Water | 35.0 |

These reactants are dissolved in the water and the pH is adjusted to 7.0–7.5 with a small amount of hydrochloric acid. This reaction mixture is then heated in a reaction vessel equipped with a reflux condenser for about twenty-four hours at 95°–100° C. During the reaction, an oil separates but no ammonia is liberated. When this oil is disolved in an aqueous ethanol medium, crude 1-cyclohexyl-3-cyanoguanidine, which melts at 145°–150° C. is recovered therefrom. This material may be further purified by recrystallization from aqueous ethanol to yield crystalline material melting at 158°–160° C.

(b)

| Reactants | Molar Ratio |
| --- | --- |
| Sodium dicyanimide | 1.0 |
| Cyclohexylamine hydrochloride | 1.0 |
| Isopropanol | 16.5 |

A mixture of the above components is refluxed about 4 hours. The sodium dicyanimide is not very soluble in the isopropanol, so that it is difficult to distinguish between it and the sodium chloride which separates as the former reacts. The resultant reaction mixture is cooled and the sodium chloride removed therefrom. After evaporating the isopropanol solution, a gummy residue is obtained which is purified by dissolution in aqueous ethanol. 1-cyclohexyl-3-cyanoguanidine crystallizes from this solution, and after recovery and drying, it melts at 155° C. Further purification raises the melting point to 158°–159° C. The sodium chloride need not be removed by filtration, but may be leached with water from the residue obtained after the evaporation of the isopropanol.

(c)

| Reactants | Molar Ratio |
| --- | --- |
| Sodium dicyanimide | 1.0 |
| Cyclohexylamine hydrochloride | 1.0 |

The dry salts are mixed in an open vessel and the temperature is raised to substantially 90° C. where a gummy material forms. The temperature is raised further to substantially 100° C. and maintained there for about an hour. No exothermic reaction is noted nor is any ammonia liberated. After this reaction mixture is cooled, the sodium chloride is leached therefrom with water, and the residue is recrystallized from aqueous ethanol to yield 1-cyclohexyl-3-cyanoguanidine melting at 158°–160° C.

(d)

| Reactants | Molar Ratio |
| --- | --- |
| Sodium dicyanimide | 1.0 |
| Cyclohexylamine hydrochloride | 0.9 |
| Water | 5.5 |

The above mixture is heated at substantially 100° C. for about seven and one-half hours. Two liquid phases are present after about three hours of the heating. The oil which separates becomes a gummy material at the completion of the reaction, and this material, after recovery and recrystallization from aqueous ethanol, yields 1-cyclohexyl-3-cyanoguanidine melting at 158°–159° C.

Example 9

1-butyl-3-cyanoguanidine

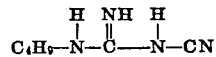

| Reactants | Molar Ratio |
| --- | --- |
| Potassium dicyanimide | 1.0 |
| Butylamine hydrochloride | 0.9 |
| Water | 1.4 |

These three components are mixed and stirred at substantially 100° C. in a reaction vessel equipped with a reflux condenser. After about one and one-half hours, the reaction mixture is no longer homogeneous, and after heating an additional two hours, the reaction mixture is cooled, diluted with water and allowed to stand overnight. This insoluble oil does not readily crystallize until it is seeded, but after seeding, crystalline 1-butyl-3-cyanoguanidine is obtained. This material is then recrystallized from hot water to give a colorless crystalline product melting at 72°–74° C.

Example 10

1-octyl-3-cyanoguanidine

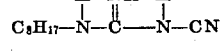

| Reactants | Molar Ratio |
| --- | --- |
| Octylamine | 1.0 |
| Hydrochloric acid | 1.0 |
| Sodium dicyanimide | 0.99 |

The concentrated hydrochloric acid is carefully added to the octylamine so that a concentrated aqueous solution of the amine salt is obtained. The sodium dicyanimide is added thereto, and this mixture is heated at substantially 100° C. in an open vessel. During the first hour, the pH rises from the neutral point to approximately 8.5 and the water is completely evaporated. The heating is continued an additional five to six hours, and the final reaction mixture is diluted with water, cooled, acidified, and agitated until a crystalline product is obtained. The colorless crystalline 1-octyl-3-cyanoguanidine is recovered and washed with water. After drying it melts at 65°–66° C.

EXAMPLE 11

1-dodecyl-3-cyanoguanidine

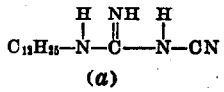

(a)

| Reactants | Molar Ratio |
|---|---|
| Dodecylamine | 1.0 |
| Ammonium chloride | 1.03 |
| Sodium dicyanimide | 1.05 |

The dodecylamine hydrochloride is first prepared by heating the amine and the ammonium chloride in the presence of a small amount of water and ethanol in an open vessel at the temperature of approximately 90° C. in order to dissipate the liberated ammonia. The sodium dicyanimide and a small portion of water are added to the neutral doughy mass of amine hydrochloride, and this mixture is heated for about 3.5 hours at substantially 100° C. After this heating period the pH was adjusted to 8.5 with a small portion of dodecylamine and the heating is continued for another 6 hours at substantially 100° C. The reaction mixture becomes a thin oily substance and no exothermic tendencies are noted. After this heating is completed, the reaction mixture is diluted with cold water and stirred until crystalline material forms. The solid is filtered and reslurried in water containing a small amount of sodium hydroxide. After a second filtration the wet cake is dissolved in hot ethanol and any alkalinity which remains is neutralized with acetic acid. This alcoholic solution is diluted with a small portion of water and allowed to cool slowly. Crystalline 1-dodecyl-3-cyanoguanidine separates and after filtering, washing with water containing a small amount of acetic acid, and air-drying, the crystalline material melts at 86°–89° C.

(b)

| Reactants | Molar Ratio |
|---|---|
| Dodecylamine | 1.0 |
| Sulfuric acid | 0.50 |
| Sodium dicyanimide | 1.12 |
| Butanol | 4.4 |
| Water | 5.6 |

The sulfuric acid is diluted with one-half of the above amount of water and this solution is carefully added to the butanol solution of dodecyamine. The pH of the resulting solution of dodecylamine sulfate is about 7–8. The sodium dicyanimide is added and the resulting reaction mixture is heated to 95°–100° C. The water is removed under slightly reduced pressure in 45 minutes, while the heating is continued for approximately 2.5 hours. The remaining one-half of the water is added, then removed as described above. The reaction mixture is heated an additional 1.3 hours at substantially 100° C. The presence of a small amount of water in this reaction facilitates the formation of sodium sulfate and accelerates the reaction. After the above heating has been completed a large volume of water is added and the butanol is separated from the reaction mixture by azeotropic distillation. The 1-dodecyl-3-cyanoguanidine crystallizes in the aqueous residue, and, after purification and recrystallization from aqueous alcohol as outlined in Example 11a, the product melts at 86°–89° C.

EXAMPLE 12

1-octadecyl-3-cyanoguanidine

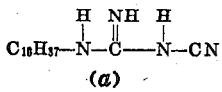

(a)

| Reactants | Molar Ratio |
|---|---|
| Octadecylamine hydrochloride | 1.00 |
| Sodium dicyanimide | 1.06 |
| Water | 6.20 |

A mixture of the above reactants is prepared and heated in an open reaction vessel to substantially 100° C. This reaction mixture is agitated and the pH adjusted to 8–9 with a small amount of octadecylamine. After about an hour the viscous solid changes to a thin oil, and the heating is continued for 4.5 hours. During the heating water is evaporated from the reaction mixture with the assistance of a mild current of air passing over the surface of the reaction mixture. After completion of the heating the reaction mixture is diluted with water and the resulting solid is recovered therefrom. This solid is slurried in a large volume of water containing a small amount of sodium hydroxide. After the solid is filtered from this alkaline solution the resulting wet cake is dissolved in a large volume of hot ethanol and any remaining alkalinity is neutralized with acetic acid. This aloholic solution is cooled and 1-octadecyl-3-cyanoguanidine crystallizes therefrom. The crystalline material is recovered and after washing with additional ethanol and drying, the 1-octadecyl-3-cyanoguanidine melts at 95°–96° C.

(b)

| Reactants | Molar Ratio |
|---|---|
| Octadecylamine | 1.00 |
| Acetic acid | 1.00 |
| Sodium dicyanimide | 1.05 |
| Water | 7.00 |

The octadecylamine acetate is prepared in water from the amine and acetic acid. The sodium dicyanimide is added to this reaction mixture and the temperature is raised to substantially 100° C. The procedure for preparing 1-octadecyl-3-cyanoguanidine is substantially the same from here on as that reported in Example 12a. The crystalline solid 1-octadecyl-3-cyanoguanidine melts at the same point as that recorded in the aforementioned example.

(c)

| Reactants | Molar Ratio |
|---|---|
| Octadecylamine | 1.0 |
| Sulfuric acid | 0.5 |
| Sodium dicyanimide | 1.1 |
| Butanol | 2.2 |
| Water | 5.6 |

A solution of octadecylamine sulfate is prepared by carefully adding the sulfuric acid, diluted with one-half the above water, to a butanol solution of the amine. The sodium dicyanimide is then added to the resultant amine salt, and the temperature is raised and maintained at substantially 100° C. The water is removed under slightly reduced pressure while the reaction mixture is heated for about 1.75 hours.

Two separate portions of water and butanol in a molar ratio of about 1.4:1.1. are added to the reaction mixture and then subsequently azeotropically distilled therefrom. Again as in Example 11b, this water serves to facilitate the formation of the 1-octadecyl-3-cyanoguanidine and sodium sulfate. Each of these azeotropic distillations and heating periods consumes about an hour. The total time during which the reaction is heated at 90°–100° C. is approximately four hours. Upon completion of the heating a large volume of water is added to the reaction mixture and the butanol is azeotropically distilled therefrom. The oily material in the residue crystallizes on cooling, and after subsequent recovery and recrystallization the 1-octadecyl-3-cyanoguanidine melts at 95°–96° C.

EXAMPLE 13

*1,1-cyclopentamethylene-3-cyanoguanidine*

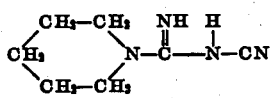

| Reactants | Molar Ratio |
| --- | --- |
| Piperidine | 1.0 |
| Hydrochloric acid | 1.0 |
| Sodium dicyanimide | 1.0 |

The piperidine is carefully added to the concentrated hydrochloric acid so that a concentrated aqueous solution of piperidine hydrochloride is prepared. It may be necessary to supply external cooling to the reaction vessel in which the above solution is prepared. The solid sodium dicyanimide is added to the concentrated solution of piperidine hydrochloride and this reaction mixture is stirred and heated at substantially 100° C. This heating is maintained for approximately 2.5 hours during which time a current of air is passed over the surface of the reaction mixture to assist in the evaporation of water and the pH is maintained at 7.5–8.5. This reaction mixture is diluted with water, cooled and the solid which crystallizes is filtered therefrom. This crude 1,1 - cyclopentamethylene - 3 - cyanoguanidine is recrystallized from a large volume of hot water, and the crystalline solid obtained therefrom melts at 166°–168° C.

EXAMPLE 14

*1,1-dibutyl-3-cyanoguanidine*

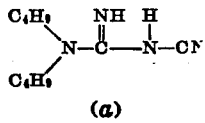

(a)

| Reactants | Molar Ratio |
| --- | --- |
| Dibutylamine | 1.0 |
| Hydrochloric acid | 1.0 |
| Sodium dicyanimide | 1.0 |

The concentrated aqueous solution of dibutylamine hydrochloride is prepared by carefully adding the concentrated acid to the amine. External cooling may be necessary to assist in the dissipation of the heat of neutralization. The sodium dicyanimide is added to the concentrated aqueous amine salt solution and the reaction mixture is heated to substantially 100° C. This reaction mixture is heated for approximately 5.5 hours during which time additional water evaporates and the pH is maintained at 7.5–8.5. Two liquid phases are present prior to the removal of water. After completion of the heating the reaction mixture is diluted with water, cooled, and stirred until the gummy material crystallizes. This slurry is made slightly acid with acetic acid and after filtering, washing, and air-drying the crystalline 1,1-dibutyl-3-cyanoguanidine melts at 72°–75° C.

(b)

| Reactants | Molar Ratio |
| --- | --- |
| Dibutylamine | 1.0 |
| Sulfuric acid | 0.5 |
| Sodium dicyanimide | 1.1 |
| Butanol | 2.27 |

A butanol solution of dibutylamine sulfate is prepared by adding sulfuric acid diluted with one-half the above amount of butanol to dibutylamine dissolved in the remainder of the butanol. The pH of this mixture is adjusted to 8 with a small amount of amine, and the finely ground sodium dicyanamide is added thereto. This mixture is heated for 5.5 hours at 95°–100° C., then poured into a large volume of water. After externally cooling this resultant mixture with ice-water, the oily product solidifies, and it is filtered, washed with dilute alkali and water, and dried under vacuum. The resulting crude 1,1-dibutyl-3-cyanoguanidine is recrystallized from aqueous ethanol and it melts at 72°–75° C.

EXAMPLE 15

*1,1'-decamethylene-bis-3,3'-cyanoguanidine*

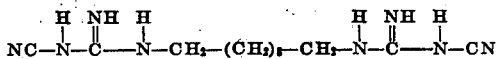

| Reactants | Molar Ratio |
| --- | --- |
| Decamethylenediamine dihydrochloride | 0.46 |
| Sodium dicyanimide | 1.00 |
| Water | 2.80 |
| Butanol | 1.37 |

The decamethylenediamine dihydrochloride and the sodium dicyanimide are mixed in water and heated to substantially 100° C. Air is blown over the surface of the mixture to assist in the removal of the water, which is completed in about an hour. The butanol is then added to the oily solid residue and a reflux condenser is attached to the reaction vessel. The reaction mixture is heated an additional 6 hours at substantially 100° C. After about the second hour of heating the oily material crystallized exothermically. Upon completion of the heating period, a large volume of water is added, and the butanol is azeotropically distilled from the reaction mixture. The crystalline product, 1,1'-decamethylene-bis-3,3'-cyanoguanidine, is filtered, washed with water and acetone, and dried. This material may be recrystallized from an aqueous ethanol solution, and after recovery the dry material melts at 180°–185° C.

EXAMPLE 16

*Methylene-bis-(1,1'-p-phenylene-3,3'-cyanoguanidine*

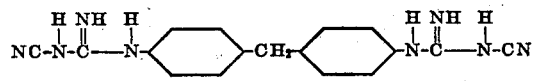

| Reactants | Molar Ratio |
|---|---|
| 4,4'-Diaminodiphenylmethane | 0.50 |
| Hydrochloric acid (10%) | 1.00 |
| Sodium dicyanimide | 1.13 |
| Ethanol | 6.40 |
| Water | 13.80 |

All the materials except the dilute hydrochloric acid are placed in a reaction vessel equipped with a stirrer, thermometer, reflux condenser, and means for the slow addition of the acid. The reaction mixture is heated to refluxing, and the acid is slowly added thereto during the period of about one hour. Solid material gradually precipitates from solution as the reaction progresses. After cooling methylene-bis-(1,1' - p-phenylene-3,3'-cyanoguanidine) is filtered from the reaction mixture. The solid is washed well with water and acetone, and after air-drying it decomposes at 272°–274° C. This product, methylene-bis-(1,1'-p-phenylene-3,3'-cyanoguanidine), is insoluble in all common solvents.

EXAMPLE 17

*1-benzyl-3-cyanoguanidine*

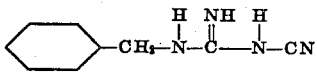

| Reactants | Molar Ratio |
|---|---|
| Benzylamine | 1.0 |
| Sulfuric acid | 0.56 |
| Sodium dicyanimide | 1.12 |
| Butanol | 11.7 |
| Water | 4.1 |

After the sulfuric acid is diluted with about 21% of the butanol, it is added slowly to a solution of benzylamine dissolved in the remaining 79% of the butanol. The pH of this solution is about 7–8. The sodium dicyanimide and about 30% of the above amount of water is added to the amine sulfate solution. This reaction mixture is heated at substantially 100° C. for a total of approximately 6.5 hours. At several points during this heating small amounts of water are added to the reaction mixture and subsequently distilled therefrom. Upon completion of the heating, the reaction mixture is diluted with a large volume of water, and the butanol is azeotropically distilled therefrom. The oily product remaining in the residue crystallizes when the latter is cooled. This crude solid, 1-benzyl-3-cyanoguanidine, is treated with dilute sodium hydroxide and dilute acetic acid, in order to remove any residual amine. The solid is then recovered, washed with water, and recrystallized from fresh hot water to yield 1-benzyl-3-cyanoguanidine melting at 108°–109° C.

EXAMPLE 18

*1-β-sulfoethyl-3-cyanoguanidine*

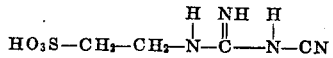

| Reactants | Molar Ratio |
|---|---|
| Taurine | 1.0 |
| Sodium dicyanimide | 1.0 |
| Water | 22.2 |
| Butanol | 5.5 |

The taurine is dissolved in water and the resulting solution is made neutral with a small amount of 10% sodium hydroxide. The sodium dicyanimide and butanol are then added and the reaction mixture is heated to 90°–100° C. The reaction mixture is heated 3 to 4 hours at this temperature while water is removed therefrom. Upon completion of the heating, the solvents are removed under reduced pressure from the reaction mixture, and an oily residue is obtained, which, when cooled, is a gummy solid. After prolonged drying under vacuum this gummy solid yields crystals of the crude sodium salt of 1-β-sulfoethyl-3-cyanoguanidine which melt at 105°–120° C. 1-β-sulfoethyl-3 - cyanoguanidine may be prepared by carefully acidifying this sodium salt with hydrochloric acid in the cold.

These examples are illustrative of the types of substituted 3-cyanoguanidines which may be prepared. The substituent on the 3-cyanoguanidine is determined by the amine which reacts with the dicyanimide. Thus by choosing the proper primary or secondary amine it is possible to prepare a wide variety of substituted 3-cyanoguanidines by the method of the present invention.

The substituted 3-cyanoguanidines of the present invention are valuable new organic chemical intermediates and they may be useful in the preparation of pharmaceuticals, dyes, insecticides, oxidation inhibitors, rubber accelerators, plasticizers, resin formers or modifiers, ion exchange resins, leather, paper, and textile treating agents, and the like.

While the invention has been described with particular reference to specific embodiments, it is to be understood that it is not to be limited thereto but is to be construed broadly and restricted solely by the scope of the appended claims.

What is claimed:

1. A method of preparing a 1-substituted-3-cyanoguanidine which comprises reacting a member of the group consisting of dicyanimide and a metal salt thereof with a member of the group consisting of a primary amine, a secondary amine, and a salt thereof, at a temperature of at least 50° C., said reactants being employed in the ratio of one mol of the dicyanimide reactant to one mol of the amine reactant, to produce the correspondingly substituted 3-cyanoguanidine.

2. A method of preparing a 1-dodecyl-3-cyanoguanidine which comprises reacting a member of the group consisting of dicyanimide and a metal salt thereof with an acid addition salt of dodecylamine at a temperature within the range of 50°–125° C., said reactants being employed in a ratio of substantially one mol of the dicyanimide reactant per mol of the amine salt to produce a 1-dodecyl-3-cyanoguanidine.

3. A method of preparing a 1-cyclohexy-3-cyanoguanidine which comprises reacting a member of the group consisting of dicyanimide and a metal salt thereof with an acid addition salt of cyclohexyl amine at a temperature within the range of 50°–125° C., said reactants being employed in a ratio of substantially one mol of the dicyanimide reactant per mol of the amine salt.

4. A method of preparing a 1,1'-decamethylene-bis-3,3-cyanoguanidine which comprises reacting a member of the group consisting of dicyanimide and a metal salt thereof with an acid addition salt of decamethylene diamine at a temperature within the range of 50°–125° C., said reactants being employed in a ratio of substantially one mol of dicyanimide per mol of amine.

BRYAN C. REDMON.
DANIEL E. NAGY.

(References on following page)

REFERENCES CITED

The following references are of record in the file of this patent:

UNITED STATES PATENTS

| Number | Name | Date |
|---|---|---|
| 2,258,321 | Ericks | Oct. 7, 1941 |
| 2,265,944 | Langhorst et al. | Dec. 9, 1941 |
| 2,325,586 | Bolton et al. | Aug. 3, 1943 |

OTHER REFERENCES

Jour. Praktiscke Chem., vol. 77, p. 542, 1908.
Chem. Abstracts, vol. 3, p. 1865, 1909; ibid., vol. 18, p. 229, 1924.
Berichte, vol. 62, p. 1394, 1929.
Chem. Abstracts, vol. 36, p. 5792, 1942.